(12) United States Patent
Conny Särevall et al.

(10) Patent No.: US 12,045,534 B2
(45) Date of Patent: Jul. 23, 2024

(54) PROVIDING CONTENT IN A MULTIUSER DIGITAL WHITEBOARD SESSION

(71) Applicant: Cisco Technology, Inc., San Jose, CA (US)

(72) Inventors: Cristoffer Karl Conny Särevall, Oslo (NO); Magne Pettersen Zachrisen, Oslo (NO); Andreas Aardal Hanssen, Hvalstad (NO); Øyvind Kurisaki-Sagberg, Bekkestua (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/304,749

(22) Filed: Apr. 21, 2023

(65) Prior Publication Data

US 2023/0251813 A1     Aug. 10, 2023

Related U.S. Application Data

(63) Continuation of application No. 17/893,734, filed on Aug. 23, 2022, now abandoned, which is a
(Continued)

(51) Int. Cl.
*G06F 3/14*     (2006.01)
*G06F 3/0481*     (2022.01)
(Continued)

(52) U.S. Cl.
CPC .......... *G06F 3/1454* (2013.01); *G06F 3/0481* (2013.01); *G06F 3/04883* (2013.01); *G06F 16/176* (2019.01)

(58) Field of Classification Search
None
See application file for complete search history.

(56) References Cited

U.S. PATENT DOCUMENTS 9,430,140 B2   8/2016   Reuschel et al.
9,489,114 B2   11/2016   Coplen et al.
(Continued)

OTHER PUBLICATIONS

Xin Xiao et al., "A Novel Approach for Sharing White Board Between PC and PDAs with Multi-users", IFIP International Federation for Information Processing 2006, EUC 2006, LNCS 4096, pp. 1129-1138, https://pdfs.semanticscholar.org/f370/8adbbc3fd413ebe1af0f2b179256d45c799d.pdf, downloaded Feb. 28, 2019, 10 pages.

(Continued)

*Primary Examiner* — Christopher J Kohlman
(74) *Attorney, Agent, or Firm* — Edell, Shapiro & Finnan, LLC

(57) ABSTRACT

Presented herein are systems and methods that allow for dynamic tracking of changes made by an interacting participant. The non-interacting participants follow the changes made by the interacting participant but maintain the ability to take control of their viewport. The systems and methods introduce the concept of an area of interest (AOI), which is a region of the canvas that contains changes or modifications. The AOI relies on a notion of an active user. An active user is a participant that performs an action on the whiteboard. In order for the other participants to view and be aware of changes made to the whiteboard by the active user, the viewport of each device is automatically mapped to contain the AOI.

20 Claims, 15 Drawing Sheets

Related U.S. Application Data continuation of application No. 17/153,947, filed on Jan. 21, 2021, now Pat. No. 11,442,686, which is a continuation of application No. 16/397,160, filed on Apr. 29, 2019, now Pat. No. 10,929,088.

(60) Provisional application No. 62/820,443, filed on Mar. 19, 2019.

(51) Int. Cl.
*G06F 3/04883* (2022.01)
*G06F 16/176* (2019.01)

(56) References Cited

U.S. PATENT DOCUMENTS

| | | |
|---|---|---|
| 9,983,854 B2 | 5/2018 | Parker et al. |
| 2002/0049786 A1 | 4/2002 | Bibliowicz et al. |
| 2008/0046828 A1 | 2/2008 | Bibliowicz et al. |
| 2008/0189365 A1 | 8/2008 | Narayanaswami et al. |
| 2016/0085381 A1* | 3/2016 | Parker .................. G06F 8/34 715/753 |
| 2016/0179754 A1 | 6/2016 | Borza et al. |

OTHER PUBLICATIONS

Daniel Lindstrom et al., "Design and Implementation of a Shared Whiteboard Application for Industrial Environments", http://www.diva-portal.org/smash/record.jsf?pid=diva2%3A1029463&dswid=8659, Oct. 4, 2016, 44 pages.

Ziteboard, "FAQ: whiteboard, collaboration, boards, images, zoom", https://ziteboard.com/faq/, downloaded Feb. 28, 2019, 12 pages.

* cited by examiner

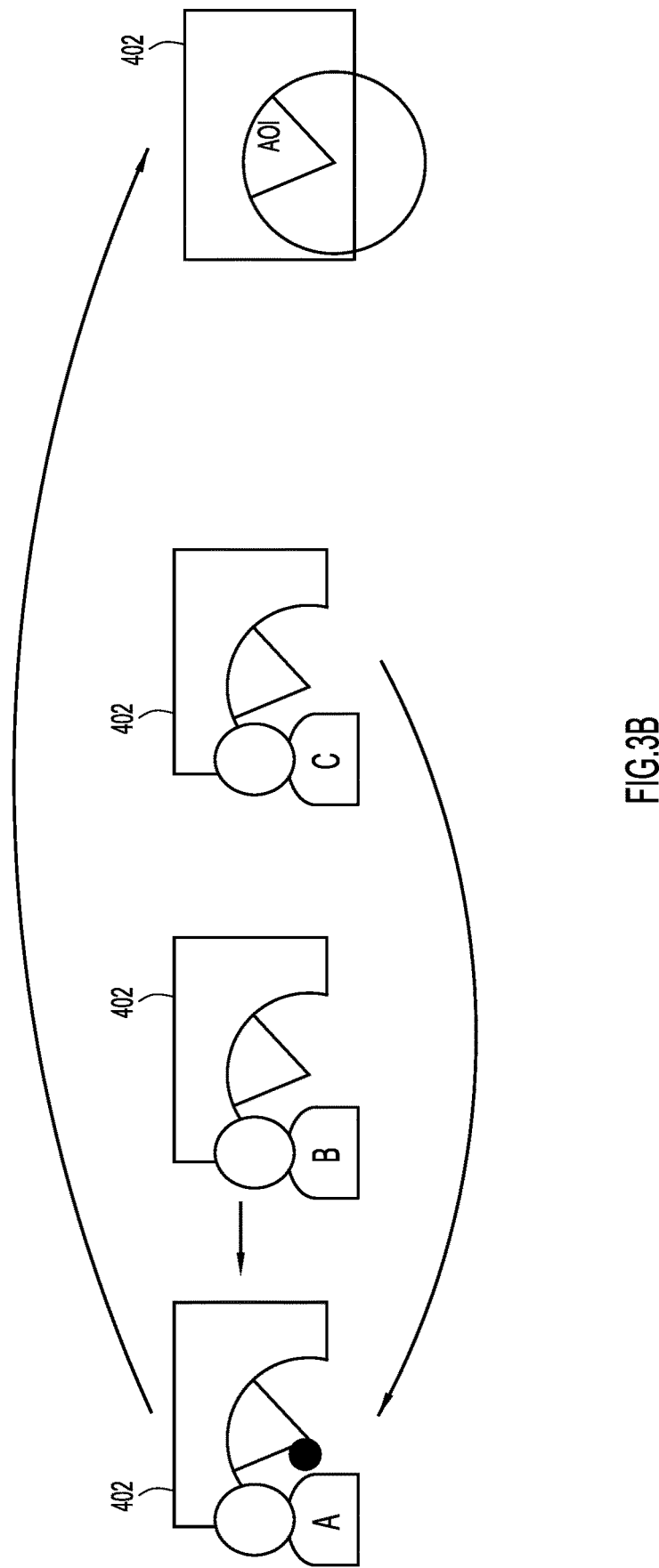

PROVIDING CONTENT IN A MULTIUSER DIGITAL WHITEBOARD SESSION

CROSS-REFERENCE TO RELATED APPLICATIONS

This application is a continuation of U.S. patent application Ser. No. 17/893,734, entitled "PROVIDING CONTENT IN A MULTIUSER DIGITAL WHITEBOARD SESSION," filed Aug. 23, 2022, which is a continuation of U.S. patent application Ser. No. 17/153,947, entitled "PROVIDING CONTENT FROM A COLLABORATION WHITEBOARD IN A VIRTUAL MEETING SPACE ENVIRONMENT," filed Jan. 21, 2021, and issued as U.S. Pat. No. 11,442,686, which is a continuation of U.S. patent application Ser. No. 16/397,160, entitled "ACTIVE AREA OF INTEREST TRACKING IN A MULTIUSER DIGITAL WHITEBOARDING SESSION," filed Apr. 29, 2019 and issued as U.S. Pat. No. 10,929,088, which claims the benefit of priority under 35 U.S.C. § 119(e) to U.S. Provisional Patent Application Ser. No. 62/820,443, entitled "ACTIVE AREA OF INTEREST TRACKING IN A MULTIUSER DIGITAL WHITEBOARDING SESSION," filed on Mar. 19, 2019, which are hereby incorporated by reference in their entireties.

TECHNICAL FIELD

The present disclosure relates to meeting space environments.

BACKGROUND

With various technological advancements, a meeting space environment is often virtual. In a virtual meeting space, participants may be geographically remote from one another and sharing documents and sketches may present a problem. As such, digital whiteboard is commonly used in today's virtual meeting space environment. With digital whiteboard, a number of devices that may be geographically remote may share the same whiteboard document, commonly referred to as a canvas.

BRIEF DESCRIPTION OF THE DRAWINGS

FIGS. 3A-3D are diagrams illustrating active user tracking while allowing each user to freely interact with the whiteboard when desired, according to an example embodiment.

DESCRIPTION OF EXAMPLE EMBODIMENTS

Overview

Figure 1A:
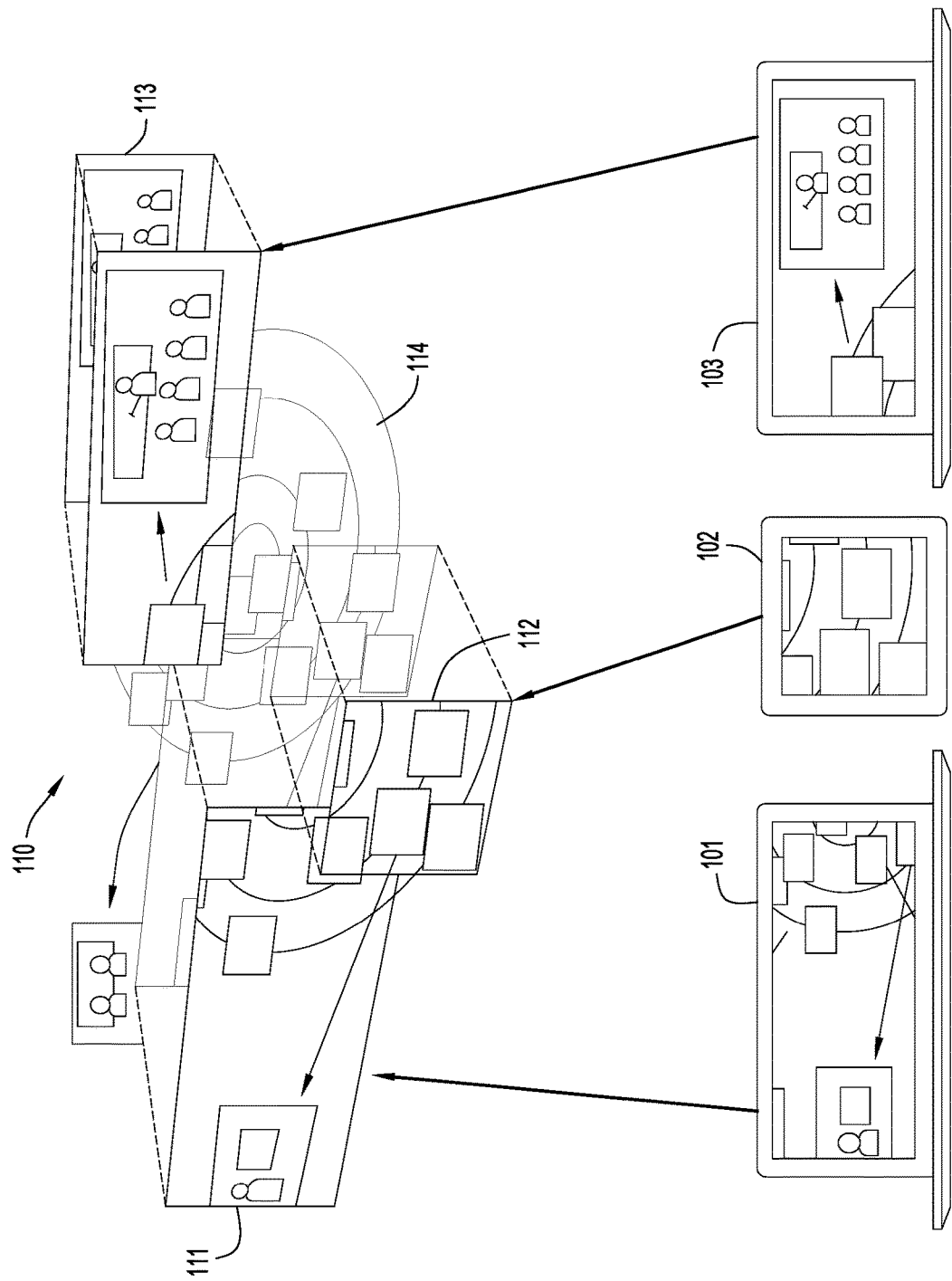
FIGS. 1A and 1B are views illustrating a mapping between viewports of various devices and contents of a whiteboard document (canvas), according to an example embodiment.

Briefly, systems and methods are provided that provide for dynamic tracking of manipulations and/or changes made by an interacting participant in a collaborative whiteboard session. In this system, the non-interacting participants follow the manipulations and/or changes made by the interacting participant.

Further, a method is provided that includes connecting, by a first device, to a collaborative whiteboard session to which at least a second device is connected and displaying, on the first device, a local viewport containing at least a portion of content of the collaborative whiteboard session. Based on detecting an activity from the second device with respect to the content of the collaborative whiteboard session, the first device determines whether to set the second device as active in the collaborative whiteboard session. Based on the second device being set as active, the first device replaces the local viewport with a second viewport of the second device and tracks on the second viewport, displayed on the first device, one or more modifications made by the second device to the content of the collaborative whiteboard session.

In another form, a method is provided that includes connecting, by a first device, to a collaborative whiteboard session to which at least a second device is connected and mapping a local viewport of the first device to follow a second viewport of the second device based on the second device being set as active in the collaborative whiteboard session. Mapping of the local viewport to the second viewport is released based on detecting an activity of the first device with respect to content of the whiteboard session. The local viewport is updated based on the activity detected from the first device.

Example Embodiments

Methods are provided for helping participants to view and be aware of changes made to a whiteboard canvas. The methods introduce the concept of an area of interest (AOI), which is a region of the canvas that contains changes or modifications. The AOI relies on a notion of an active user. An active user is a participant that performs an action on the whiteboard. In order for the other participants to view and be aware of changes made to the whiteboard by the active user, the viewport of each device is automatically mapped to contain the AOI.

Further still, methods are provided for the passive participants to follow changes or manipulations made to the whiteboard and yet be free to also manipulate the whiteboard, at any time. Additionally, methods for selecting an active user are provided.

In an example embodiment, in a meeting space environment, participants and/or users (these terms are used interchangeably throughout the description) are participating via their respective devices from various endpoints that may be geographically remote from each other. The participant and the respective user (client) device, such as a computer, laptop, tablet, smart phone, etc. may collectively be referred to as endpoints. The endpoints may communicate with each other via one or more networks such as the Internet, virtual private network (VPN), and so on.

Some of the devices may have interactive connectivity to a virtual whiteboard that is supported by a conference session. Interactions may include, but are not limited to, manipulating the whiteboard to jump to a particular whiteboard location, zooming, making changes to the actual contents such as adding, deleting, and/or editing contents of the whiteboard, and so on. Other devices may not have the interactive connectivity to the whiteboard and may only have the capability of viewing the whiteboard content during the conference session.

In an example embodiment, a whiteboard is a canvas of an infinite size. That is, the dimensions of the canvas may be unlimited. The users are free to navigate around the canvas and make use of the space above, below, left, right, and so on. The canvas has no limits or boundaries. That is, the dimensions of the canvas can be thought of as unlimited. Each device has its own viewport. A viewport is a region of the entire whiteboard or canvas that is currently visible on a display of the device i.e., a slice of the canvas.

When more than one device is sharing the same whiteboard document (canvas), each device can use panning and zooming controls to view different subsections of the canvas. If participants of the whiteboard session communicating via respective devices add new content, it may be outside of the region that is currently observed by other participants and the change or changes may go unnoticed by other participants. Since each device could be displaying a different region of the canvas, modifications may not be visible on devices other than the one performing the modifications. This can lead to a confusion for the users of the devices (participants of the meeting) that are not able to observe the modifications.

Furthermore, some devices that are capable of displaying a whiteboard document do not have an interface that allows for navigating the whiteboard. The users of such devices would not be able to manually navigate to view the changes, even if they were otherwise made aware of them.

Additionally, when multiple users make changes to the whiteboard document, chaos can result as other participants may become confused with multiple changes being made. According to various example embodiment, however, chaos is avoided and participants are able to track changes being made via an active user concept described below.

FIG. 1A is a view illustrating a mapping between viewports of various devices and content of a canvas, according to an example embodiment. According to an example embodiment, there are three participants. Each participant is using a respective user device in a whiteboarding session. This is provided by way of an example only and not by way of a limitation. One of ordinary skill in the art would readily appreciate that a number of endpoints (participants communicating via respective devices) can vary widely.

In FIG. 1A, first, second, and third participants respectively use devices 101-103 to participate in a whiteboarding session. The devices 101-103 are manipulated by their respective participants and display a different slice of the same canvas 110. The canvas 110 is an entire whiteboard. Each device of the whiteboarding session may view a slice or portion of the canvas 110. The slices may include entirely different contents or the slices may include overlapping contents. That is, one user's slice of the canvas 110 may share some of the contents of another user's slice of the canvas 110. For example, the display screens of the devices 101, 102, and 103 display respective slices 111, 112, and 113 of the canvas 110, as shown in FIG. 1A. In an example embodiment, the viewports of the user devices 101, 102, and 103 (region of the canvas currently visible on the device) are different from one another. A viewport is defined as the region of the entire whiteboard canvas that is currently visible on the device's display. If modifications are made to a portion of the canvas, for example, in an area of interest (AOI) 114, at least some of the participants may miss new or changed content in the AOI because the user devices 101-103 have different viewports (different slices of the virtual canvas 110), as shown in FIG. 1A. Thus, the AOI 114 is the region of the canvas 110 that contains the new changes.

Multiple participants may work on the same shared whiteboard and may manipulate content on the same shared whiteboard. Multiple participants may include one or more active participants that manipulate the whiteboard content and one or more passive participants. Passive participants are participants that are not making changes to the whiteboard content but may need to know where an action is occurring. An active participant may become a passive participant and vice versa as long as his or her device supports navigation and manipulation functionalities for the whiteboard session.

In an example embodiment, a relevant area of the canvas is provided to the passive participants. That is, the activity on a whiteboard that is performed by an active user is captured within the viewports of the respective passive participants. In an example embodiment, a concept of a single active user at a time is provided so that the viewport of only one active user, the one that is manipulating and/or making changes to the canvas, is shared with the passive participants.

Without the concept of a single active user at a time, it is difficult for the participants to be aware of the changes to the whiteboard and to follow changes being made. In an example embodiment presented herein, each participant is allowed to move around freely in the viewport and generate new content or update contents of the canvas. Yet, only one of these users will be chosen as an active user, and all non-interactive users will follow the changed content in order to see changes made to the contents of the canvas. In an example embodiment, some participants of a whiteboard session are making changes or editing the whiteboard, such as zooming in or navigating to a particular part of the whiteboard and making a drawing. Meanwhile, other participants may be passive. They are not taking any actions and are simply viewing their screens, which will depict a portion of the canvas being manipulated. For the passive participant to understand what is occurring on the whiteboard, his/her viewport is changed to be the same as that of an active user. For example, if an active user zooms in to a particular portion of the canvas, the screens of the passive participants zooms in to the same particular portion of the canvas as that of the active user (the editor). Accordingly, the passive participants have the same experience as the active user. In a truly collaborative environment, everyone takes turns drawing and everything is captured and observed.

Figure 1B:
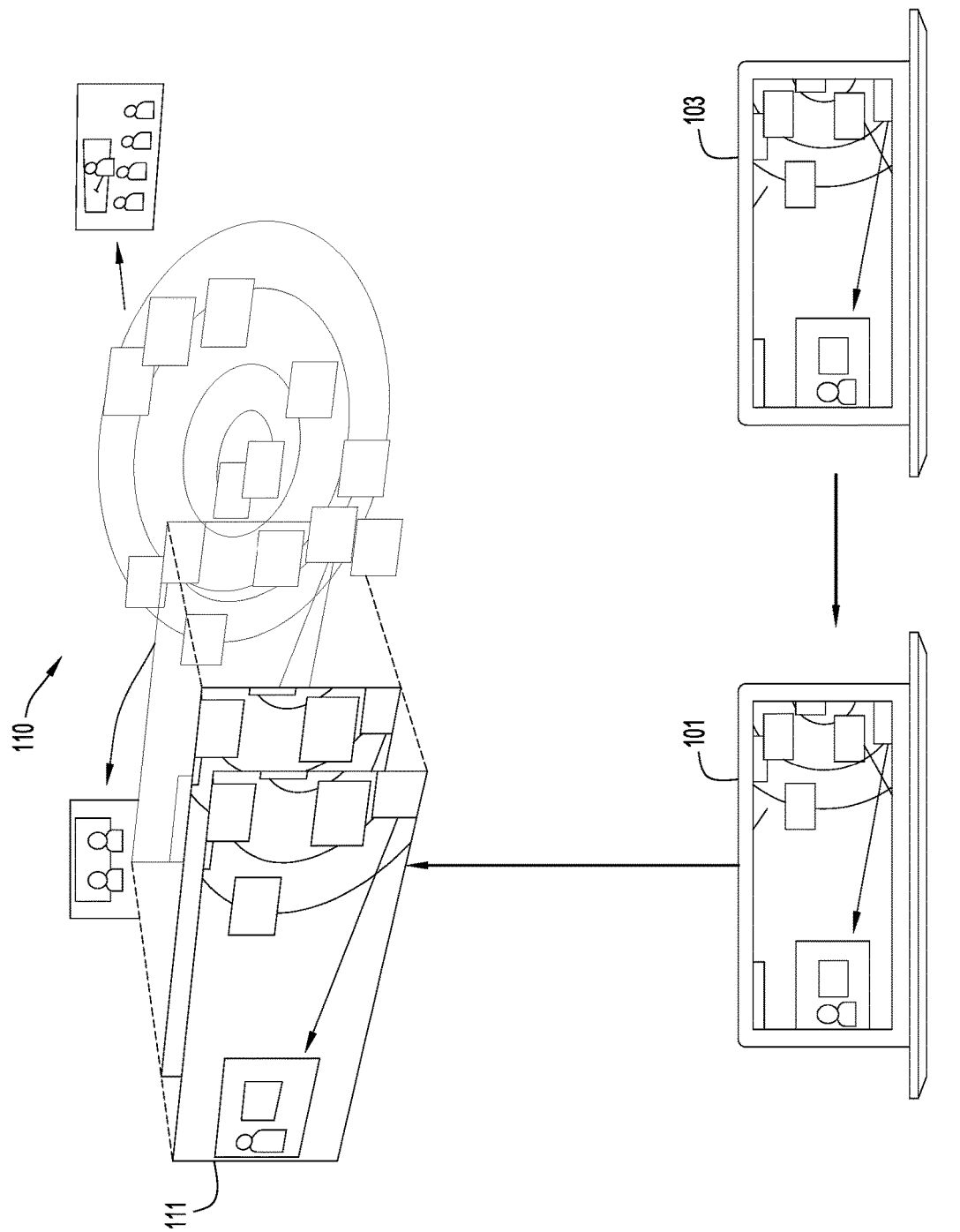

FIG. 1B is a view illustrating a concept of a passive participant following a viewport of an active participant, according to an example embodiment. In an example embodiment, a first participant may decide to follow a second participant. For example, the first participant may think that the second participant will show him/her something interesting so he/she will view the viewport of the second participant to see what the second participant is doing. As such, the first participant may understand what the second participant is doing, such as drawing an image in the canvas, by duplicating the viewport of the second participant.

As shown in FIG. 1B, the device 101 is the device of an active user and as such, his viewport will be followed by the passive participants, such as the device 103. The content displayed on the device 103 thus follows the content of device 101. For example, the user of device 101 is viewing slice 111 of the canvas 110 and the passive participant associated with device 103 will also view slice 111 of the canvas 110.

In an example embodiment, to avoid chaos and the jitter effect described above, there is only one active participant or user associated with the collaborative whiteboard session at any point in time. Techniques are presented herein by which an active user is selected for each particular point in time. An active user is dynamically selected on-the-fly and in real-time in an automated and distributed manner, as will become more apparent hereinafter.

Figure 2:
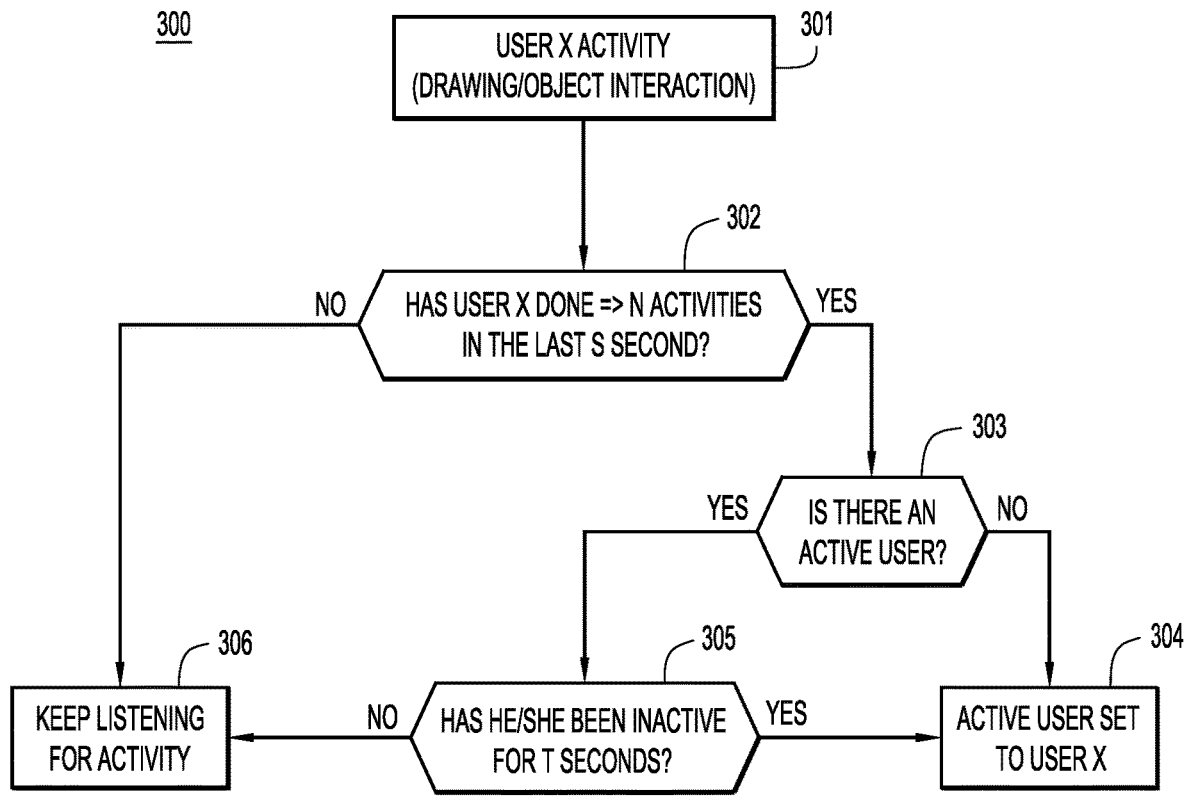
FIG. 2 is a flowchart illustrating a method of selecting an active user in a whiteboard session, according to an example embodiment.

FIG. 2 is a flowchart illustrating a method 300 of selecting an active user, according to an example embodiment. As will become apparent from the following description, this process is performed on each client device participating in the whiteboard session. As shown in FIG. 2, a user X (an arbitrary user) activity on the collaborative whiteboard is detected, in operation 301. The user X may be drawing an object on a canvas, painting on the canvas, and/or interacting with a portion of the whiteboard. Based on the detected activity of the user X, the detected activity of the user X is compared to a threshold, in operation 302. For example, a determination is made whether the user X performed at least N activities in the last S second(s). N and S are respective predetermined threshold values. For example, S may be set to a few seconds, one second, etc., and N may be set to moving a mouse along the whiteboard, clicking on a portion of the whiteboard, and/or starting to add or modify content on the whiteboard. Based on the user X not performing at least N activities in the last S seconds (operation 302 results in a no/negative determination), the user X is not set as an active user and the system proceeds to listen for further activity, (keep listening for activity—in operation 306).

Based on the user X performing at least N activities in the last S second(s), (operation 302 results in a yes/positive determination), it is determined whether an active user is already present/exists in the whiteboard session (is there an active user) in operation 303. Based on a determination that no active user is present (operation 303 results in a no/negative determination), the active user is set to user X, in operation 304. When the user X is set as an active user, the local viewport of a passive participant or participants is animated to match the viewport of the active user X.

On the other hand, if an active user already exists in the system (operation 303 results in a yes/positive determination), a check is performed to determine whether the current active user has been inactive for a predetermined number of seconds (has he/she been inactive for T seconds) in operation 305. That is, a determination is made whether a current active user is inactive for T number of seconds, where T is a predetermined threshold value which may be the same as the threshold value S described with reference to the operation 302 or may be a different threshold value (shorter or longer). For example, the predetermined threshold T may be set to a larger value than the threshold S because the user X activity may need to be immediately detected whereas the current active user may be taking a short pause in his manipulations of the whiteboard and should remain to be the active user until he is done. If in operation 305, it is determined that the current active user has been inactive for T seconds (operation 305 results in a yes/positive determination), then the active user is switched from the current user to the user X. That is, the active user is set to user X (instead of the inactive current active user), as shown in operation 304. On the other hand, if the current active user is still active i.e., activity is detected within the T seconds (operation 305 results in a no/negative determination), then the user X is not set as an active user and the method reverts to listening/detecting for activity, in operation 306.

With the addition of the active user tracking, which each non-interactive user will follow, a smooth experience for a presentation of a whiteboard is provided. Meanwhile, each user may freely interact with the whiteboard when desired and not follow the active user, as explained in further detail below. Multiple user collaboration, as well as single or multiple source presentations, are enabled using similar operations. In an example embodiment, jitter may be avoided and the user experience is greatly improved.

Figure 3A:
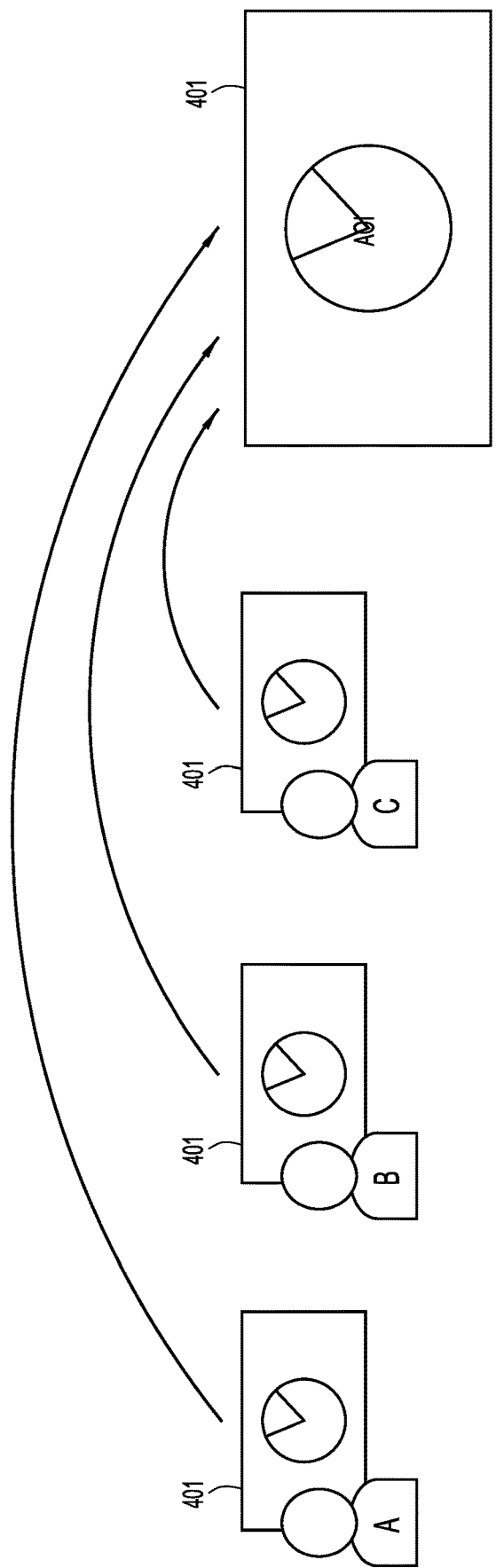

FIGS. 3A-3D are diagrams illustrating active user tracking while allowing each user to freely interact with the whiteboard when desired, according to an example embodiment. As shown in FIG. 3A, initially, all participants in the collaborative whiteboard session share the same viewport 401. That is, participants A, B, and C all share the same AOI 401. As shown, in FIG. 3B, the participant A starts drawing. That is, the activity of the participant A is detected and the participant A becomes active. Participants B and C are not manipulating their viewports and as such, the participants B and C become passive observers. Accordingly, the AOI 402 of the participant A is mapped to the viewports of the participants B and C. In other words, the viewports of the participants B and C will follow the viewport of the participant A, AOI 402.

Figure 3C:
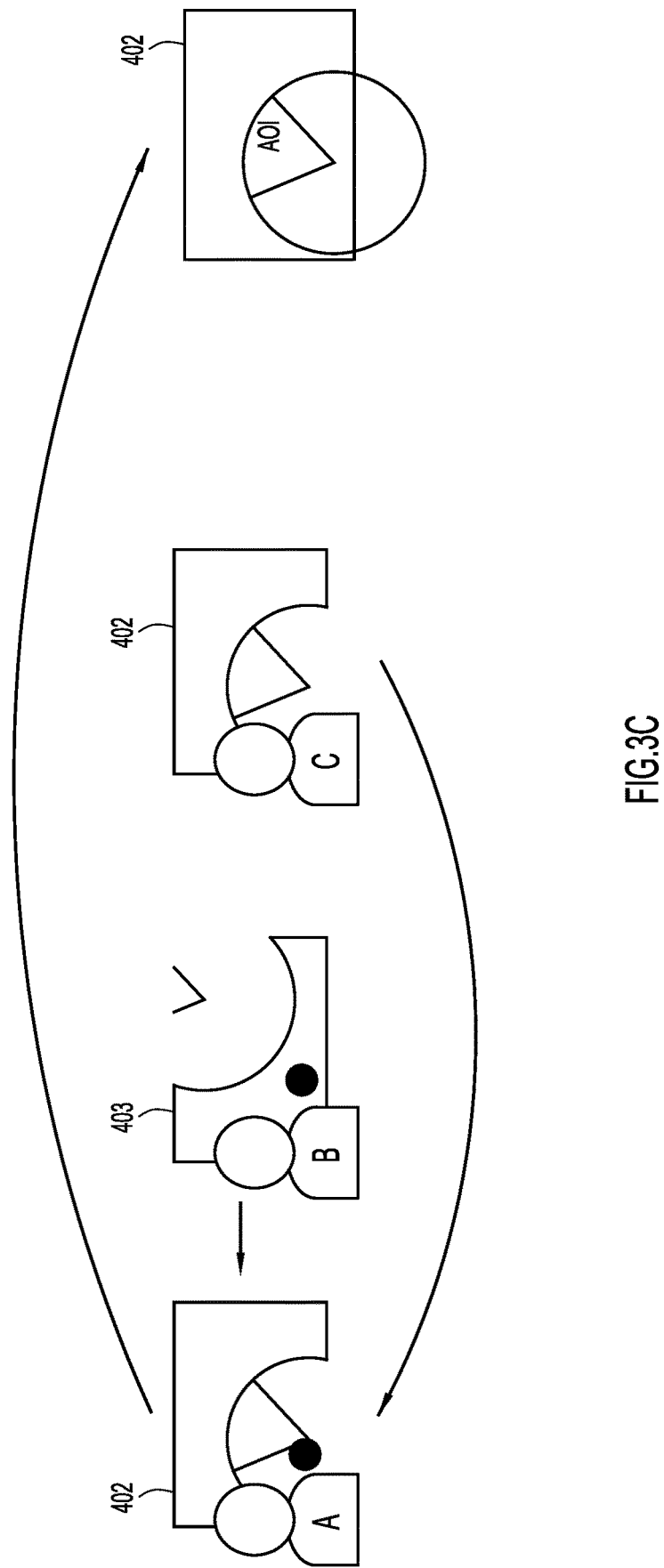

In FIG. 3C, it is detected that the participant B starts drawing on his viewport. In an example embodiment, the participant B can take control of his or her viewport and manipulate the whiteboard at any point of time.

In an example embodiment, each participant can freely interact with the whiteboard regardless of the presence of an active user. According to an example embodiment, the participant B may manually toggle between being a follower (passive observer) or manipulating the whiteboard. In other words, the passive participants are not slave followers but the following is entirely voluntary. In an example embodiment, there may be a seamless toggling from being a passive follower to a mode in which the whiteboard is manipulated locally. The participant B may take control of his local viewport and perform manipulations such as navigation and/or updates to the contents of the whiteboard. According to yet another example embodiment, once a user device detects an activity from a participant, that user device automatically switches control of the whiteboard to the user device of the active participant and the active participant stops being a follower. The local manipulations of the whiteboard are displayed to the participant on his device and an option to switch back to being a follower may be provided. As an alternative, once a user device does not detect any further activity from the participant locally manipulating the whiteboard, the participant may be prompted to switch to become a follower again or the participant may automatically and seamlessly be reverted back to being a follower. That is, if the local activity is not detected from the participant within a predetermined period of time, the participant may be reverted to being a follower of an active user. According to various example embodiments, the participants can easily switch from being a follower to starting their own manipulations of the whiteboard through explicit user interface (UI) controls or implicit UI controls such as the examples described above.

Returning to FIG. 3C, the participant B is no longer a passive viewer and changes his local viewport 403 as needed to effectuate the changes/manipulations to the whiteboard. As shown in FIG. 3C, the viewport 403 of the participant B is now different from the viewport 402 of the active participant A. Since the participant C is still passive, his local viewport follows the viewport 402 of the active user i.e., the participant A.

Figure 3D:
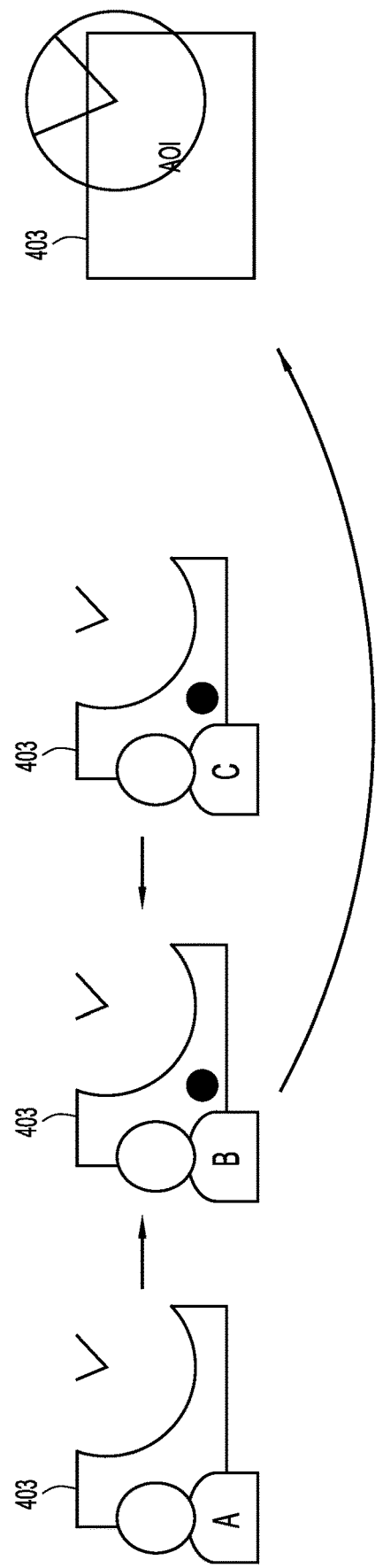

In FIG. 3D, the participant A stops manipulating the whiteboard and as such, becomes a passive participant. That is, the participant A stops drawing and becomes inactive. Accordingly, the participant B is now set to become an active user because of the detected activity of the participant B. Since participants A and C are now passive participants, their viewports will now follow the viewport 403 of the participant B.

As shown in FIGS. 3A-3D, each user or participant can move freely in an infinite canvas, and the passive users (when a user is in a passive state) will follow the activity of an active user. According to one embodiment, a centralized distribution of the viewport of an active user may be provided and in another embodiment, a decentralized end-to-end distribution of the viewport of an active user may be provided.

Figure 4:
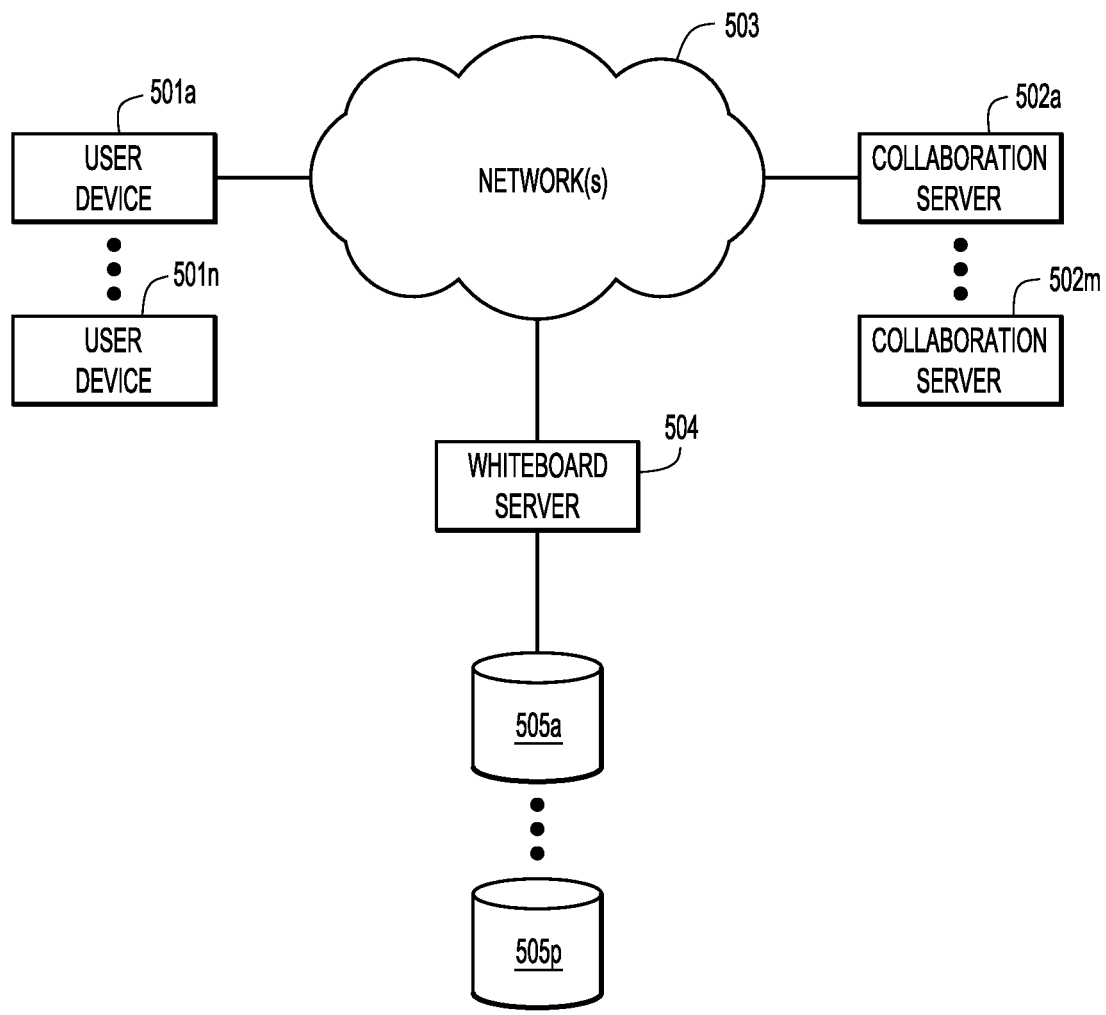
FIG. 4 is a block diagram illustrating a system providing a whiteboard service, according to an example embodiment.

FIG. 4 is a block diagram illustrating a system 500 for providing a whiteboard service, according to an example embodiment. The system 500 includes a plurality of user devices (client devices) 501a-501n, one or more collaboration servers 502a-502m, a network (or collection of networks) 503 and a whiteboard server 504 having one or more associated databases 505a-505p. As shown in FIG. 4, one or more users may be participating in a whiteboard session using their respective devices 501a-501n. The number of devices can vary widely depending on a whiteboard session. The whiteboard sessions are managed by one or more of the collaboration servers 502a-502m. The user devices 501a-501n communicate with the collaboration servers 502a-502m via network 503. The user devices 501a-501n may obtain a whiteboard session identifier and/or an identifier of a whiteboard document corresponding to the session by communicating with the collaboration servers 502a-502m. Based on an identifier of the whiteboard document obtained from the collaboration servers 502a-502m, the user devices 501a-501n may then communicate with the whiteboard server 504 to obtain the whiteboard content/document itself that is stored in one or more databases 505a-505p.

According to one embodiment, there may be no centralized deciding entity, such as an arbitration server, that decides which user in a whiteboard session is active at any given time. Instead, every user device will make its own decision as to which other client device is an active user at any given point in time. The whiteboard session may operate in a peer-to-peer (P2P) manner where each user device (client) broadcasts information to other user devices (clients) and each user device (client) makes independent decisions based on the received information. The user device broadcasts may pass through the collaboration server(s) 502a-502m, or in another form, they may be sent directly between user devices without passing through the collaboration server(s) 502a-502m.

Figure 5:
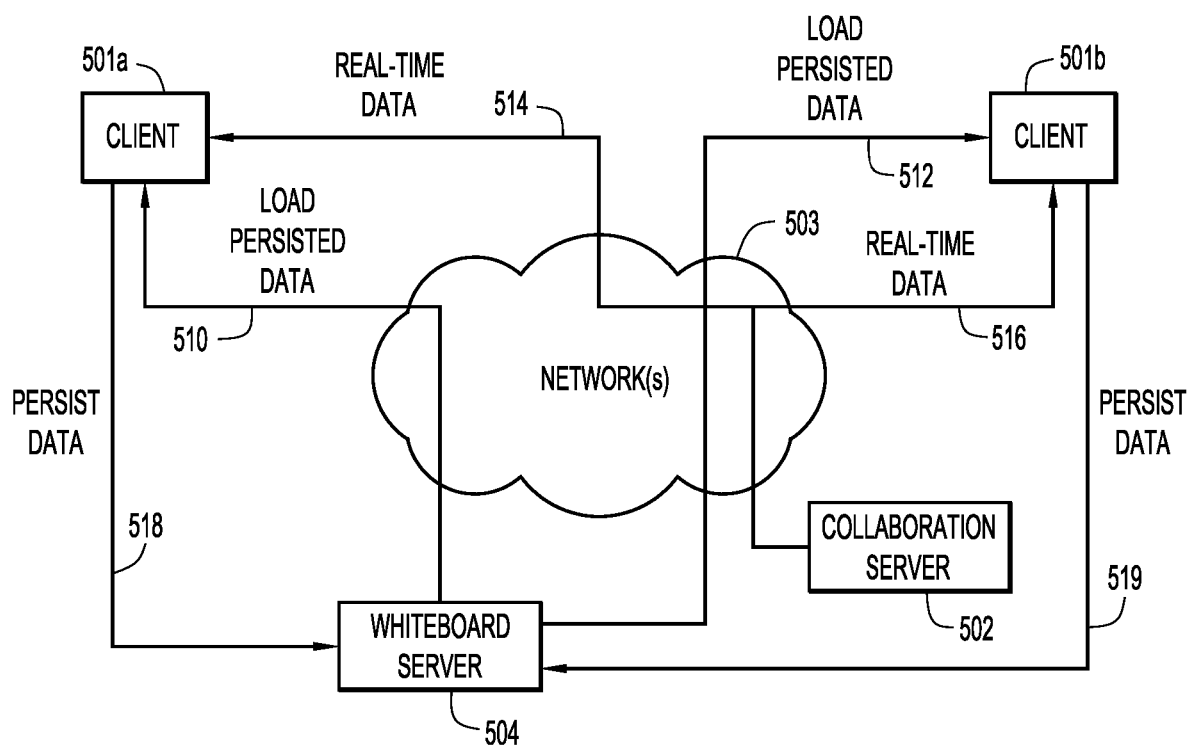
FIG. 5 is an operational flow diagram illustrating a decentralized distribution of a viewport of an active user, according to an example embodiment.

FIG. 5 is an operational flow diagram illustrating a decentralized distribution of an active user viewport, according to an example embodiment. As shown in FIG. 5, the clients 501a and 501b are user/client devices of a whiteboard session. The whiteboard session is managed and controlled by a collaboration server 502. The collaboration server 502 stores identifiers of various whiteboard sessions and identifiers of corresponding whiteboard documents that may be obtained from the whiteboard server 504. The whiteboard server 504 controls the whiteboard canvas to which multiple users may have access.

In an example embodiment, the whiteboard server 504 maintains whiteboard content (the canvas). For security purposes and to avoid data leakage, the whiteboard server 504 does not have decryption capability with respect to the whiteboard documents. The whiteboard server 504 controls the storing of the whiteboard content in encrypted format. Also, the whiteboard server 504 controls retrieval of the encrypted whiteboard content for a respective whiteboard session and communicates the retrieved whiteboard document in its encrypted form to the requesting client device. The client devices decrypt the received data and encrypt data prior to communicating with the other client devices in the session.

As shown in FIG. 5, each client 501a and 501b may load persisted data, as shown at 510 and 512, respectively. This data describes the canvas and/or a portion of the canvas that is initially shared by all the participants in the whiteboard session. As shown at 514 and 516, changes to the canvas made by the client 501a and the client 501b are broadcasted, in real-time, to each other. For example, client device 501a and client device 501b broadcasts, in real-time, its status, its viewport (e.g., viewport (coordinates xyz), just (x, y) coordinates or width and height data, in order to make it possible to ensure the full contents of a viewport is displayed inside the viewport at a receiving end, aspect ratio independently), and activity data in an encrypted form (collectively called status data). In another embodiment, the client devices may communicate status data directly to each other. In still another example embodiment, the status data is communicated to the collaboration server 502 and the collaboration server 502, based on an identifier of the whiteboard session, broadcasts the status data to other participants in the identified whiteboard session. In various example embodiments, the collaboration server 502 does not examine the contents of the status data but simply forwards it to other devices associated with the respective whiteboard session. Accordingly, each client makes its own individual decision about an active user and whether to follow an activity of a user, as explained above. Although status updates are communicated (broadcasted between clients) in real-time, only once the changes/modifications to the canvas have been committed by a respective client are the changes reported to the whiteboard server 504. The persisted encrypted data with changes to the canvas (persist data) is transmitted to the whiteboard server 504 at 518 and 519 and is stored therein in an encrypted form.

According to an example embodiment, when the user is navigating the whiteboard or making a stroke on the whiteboard, this is considered an activity that is broadcasted to all other participants of the whiteboard session. The other participants may be determined based on information maintained by the collaboration server(s) 502a-502m (shown in FIG. 4). On the other hand, when the stroke is finished or a drawing key is released, these activities may be considered as a committed change and is reported to the whiteboard server 504 where the change to the canvas is stored in its encrypted form. In an alternative embodiment, the change is committed only after the participant decides to save the change.

When a client receives a remote "activity", it uses its internally stored history of all remote activities to recalculate which, or if any, remote participant it should follow. The most recent active user is decided as follows:

a. Search through an "activity" history in reverse since the last active user switch.

b. When one single participant has a variable number of consecutive activities and all of them are within a set time limit, that participant is saved as the possible new active user.

c. Continue going through the activity history, repeating the above operation until the end of the "activity" history.

d. When a new active user is chosen, the identifier of that user is used to find the last known visual viewport, using the history with all the remote participants' viewports.

e. The local viewport is then animated to match the viewport of the active user.

Accordingly, an active user is independently selected by each client or an endpoint device. Each client or an endpoint device has autonomy and makes its own decision regarding the selection of an active user and activities within a whiteboard session.

Figure 6:
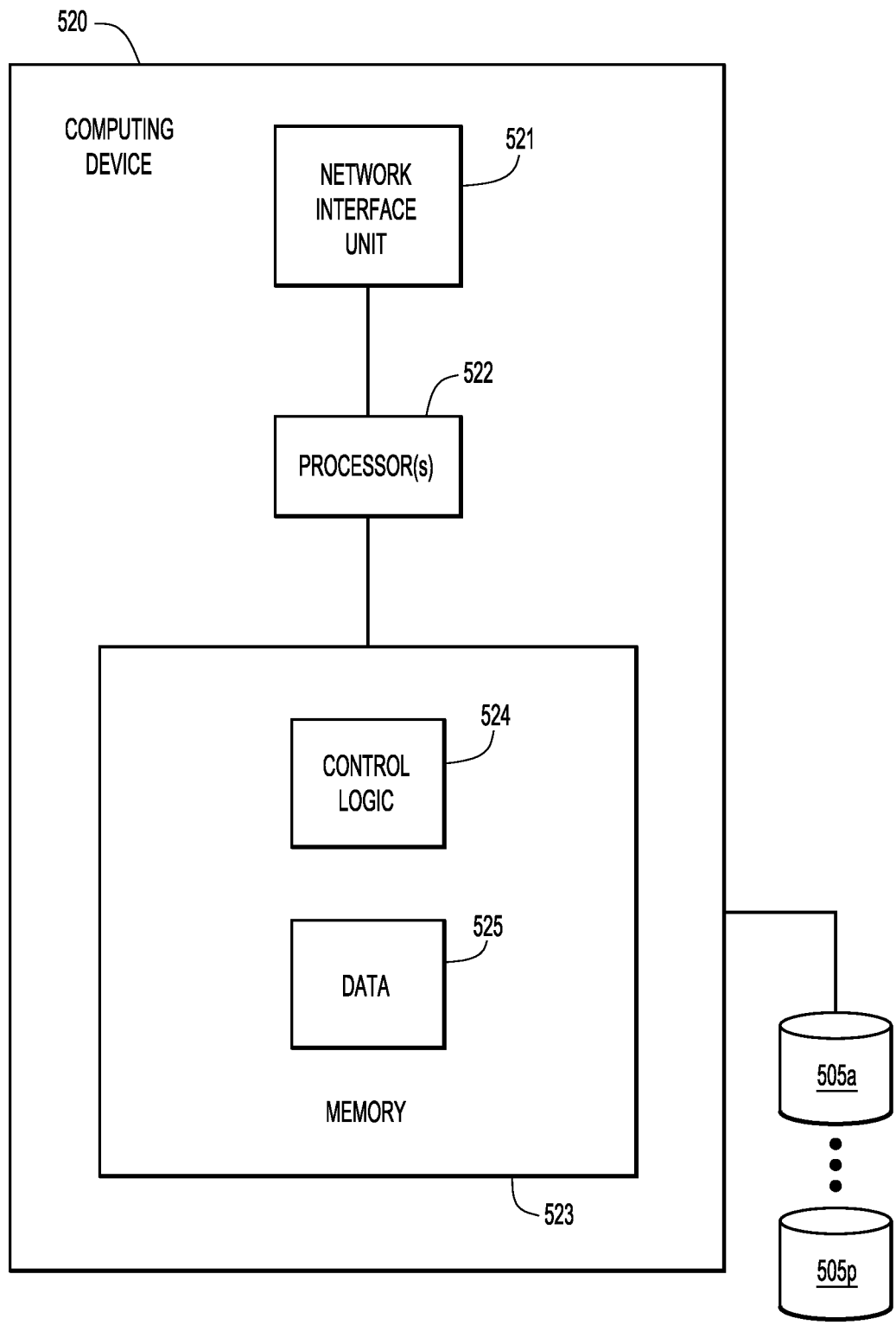
FIG. 6 is a block diagram illustrating a computer system to host a whiteboard service, according to an example embodiment.

FIG. 6 is a block diagram illustrating a computer device to host the whiteboard service, according to an example embodiment. The computer device 520 shown in FIG. 6 is one implementation of the whiteboard server 504 shown in FIGS. 4 and 5. The computer device 520 includes one or more network interfaces, referred to as a network interface unit 521 to communicate with a wired and/or wireless communication network so as to communicate with client devices such as the client devices 501a-501n depicted in FIG. 4. The computer device 520 may further include a processor 522 (or multiple processors, which may be implemented as software and/or hardware processors), and a memory 523. The network interface unit 521 may include an Ethernet card (or multiple such devices) including one or more network ports to connect with and communicate over wired network links and/or a wireless communication card including a wireless transceiver to communicate over wireless network links.

The memory 523 stores instructions for that are executed by the processor(s) 522. The memory 523 may include read only memory (ROM), random access memory (RAM), magnetic disk storage media devices, optical storage media devices, flash memory devices, electrical, optical, or other physical/tangible (non-transitory) memory storage devices. The processor 522 is, for example, a microprocessor or a microcontroller that executes instructions stored in memory. Thus, in general, the memory 523 may comprise one or more tangible computer readable storage media (e.g., a memory device) encoded with software comprising computer executable instructions and when the software is executed (by the processor 522) it is operable to perform the operations described herein. The memory 523 stores control logic 524 to perform operations of whiteboard service described herein. The memory 523 may also store data 525 used and generated by the control logic 524.

According to an example embodiment, the computer device 520 may be connected to the one or more databases 505a-505p (also shown in FIG. 4), which store data 525, such as content data representing a whiteboard session and initial viewport views to be shared among devices participating in a whiteboard session. The data may be stored in an encrypted form and is communicated in an encrypted form. Each client device will decrypt the data received from the computer device 520.

Figure 7:
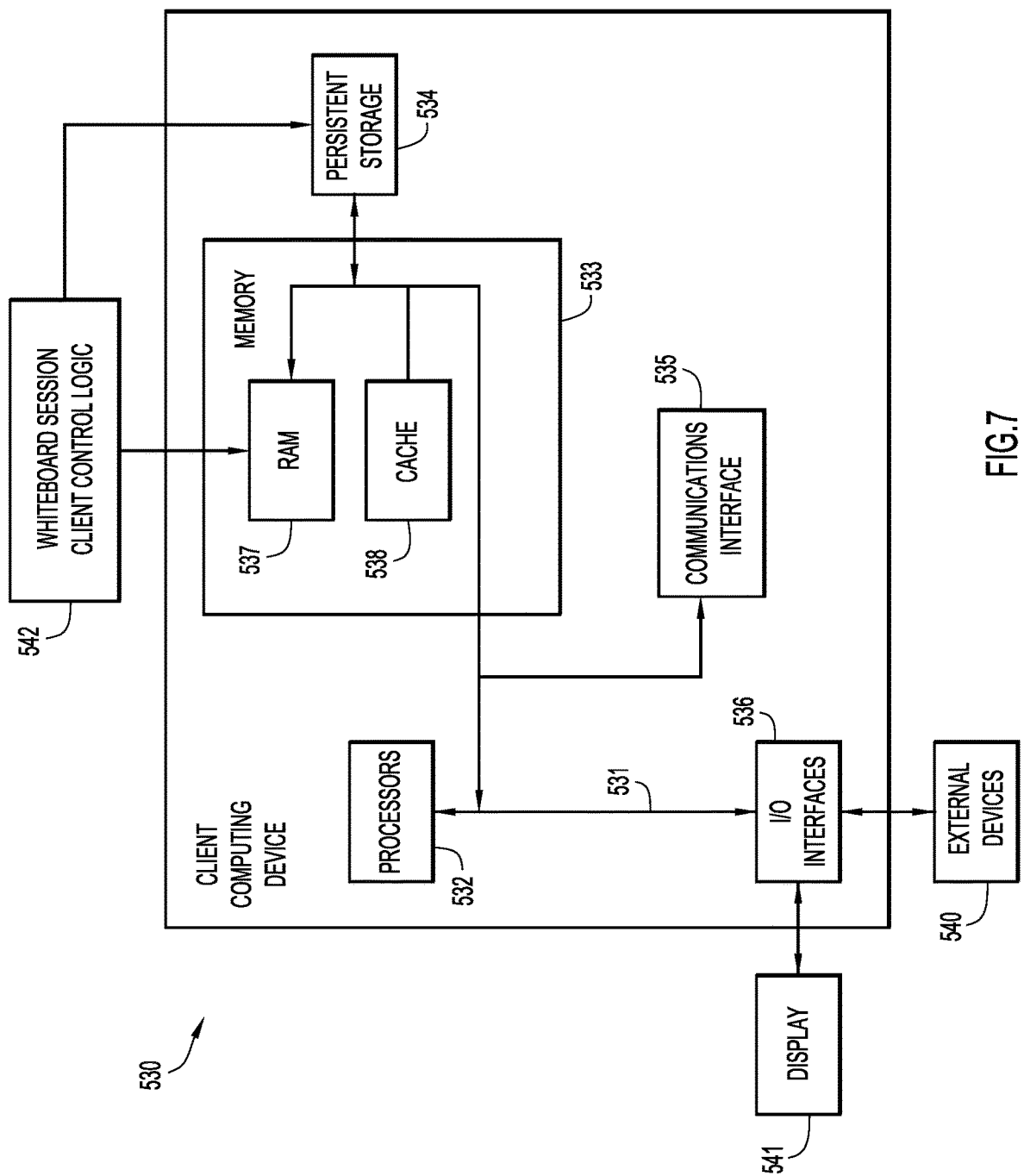
FIG. 7 is a block diagram of a client device configured to perform the viewport tracking operations presented herein in connection with a whiteboard session, according to an example embodiment.

FIG. 7 is a block diagram of a client device 530 configured to perform the viewport tracking operations presented herein in connection with a whiteboard session. Thus, the client device 530 shown in FIG. 7 is representative of the client devices 501a-501n shown in FIG. 4, according to an example embodiment. It should be appreciated that FIG. 7 provides only an illustration of one example embodiment and is not meant to be limiting.

As depicted, the client device 530 includes a bus 531, which provides communications between computer processor(s) 532, a memory 533, a persistent storage 534, communications interfaces 535, and input/output (I/O) interface(s) 536. The bus 531 can be implemented with any architecture designed for passing data and/or control information between processors (such as microprocessors, communications and network processors, etc.), system memory, peripheral devices, and any other hardware components within a system. For example, the bus 531 can be implemented with one or more buses.

The memory 533 and the persistent storage 534 are computer readable storage media. In the depicted example embodiment, the memory 533 includes random access memory (RAM) 537 and cache memory 538. In general, the memory 533 can include any suitable volatile or non-volatile computer readable storage media.

One or both of the memory 533 and persistent storage 534 may store whiteboard session client control logic 542, which includes instructions, when executed by the processor 532, cause the processor 532 to perform the user device/client device operations described herein.

The whiteboard session client control logic 542 may be stored in a persistent storage 534 for execution by one or more of the respective computer processors 532 via one or more memories of memory 533. The persistent storage 534 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 534 may also be removable. For example, a removable hard drive may be used for persistent storage 534. Other examples include optical and magnetic disks, thumb drives, and smart cards that are inserted into a drive for transfer onto another computer readable storage medium that is also part of persistent storage 534.

The communications interface 535, in these examples, provides for communications with other data processing systems or devices. In these examples, communications interface 535 includes one or more network interface cards. The communication interface 535 may provide communications through the use of either or both physical and wireless communications links.

The I/O interface(s) 536 allows for input and output of data with other devices that may be connected to computer device 530. For example, the I/O interface 536 may provide a connection to external devices 540 such as a keyboard, keypad, etc., as well as to display 541, such as a touch screen display, and/or some other suitable input device. External devices 540 can also include portable computer readable storage media such as database systems, thumb drives, portable optical or magnetic disks, and memory cards.

Software and data used to practice embodiments can be stored on such portable computer readable storage media and can be loaded onto persistent storage 534 via I/O interface(s) 536. I/O interface(s) 536 may also connect to a display 541. The display 541 provides a mechanism to display data to a user and may be, for example, a computer monitor.

Figure 8A:
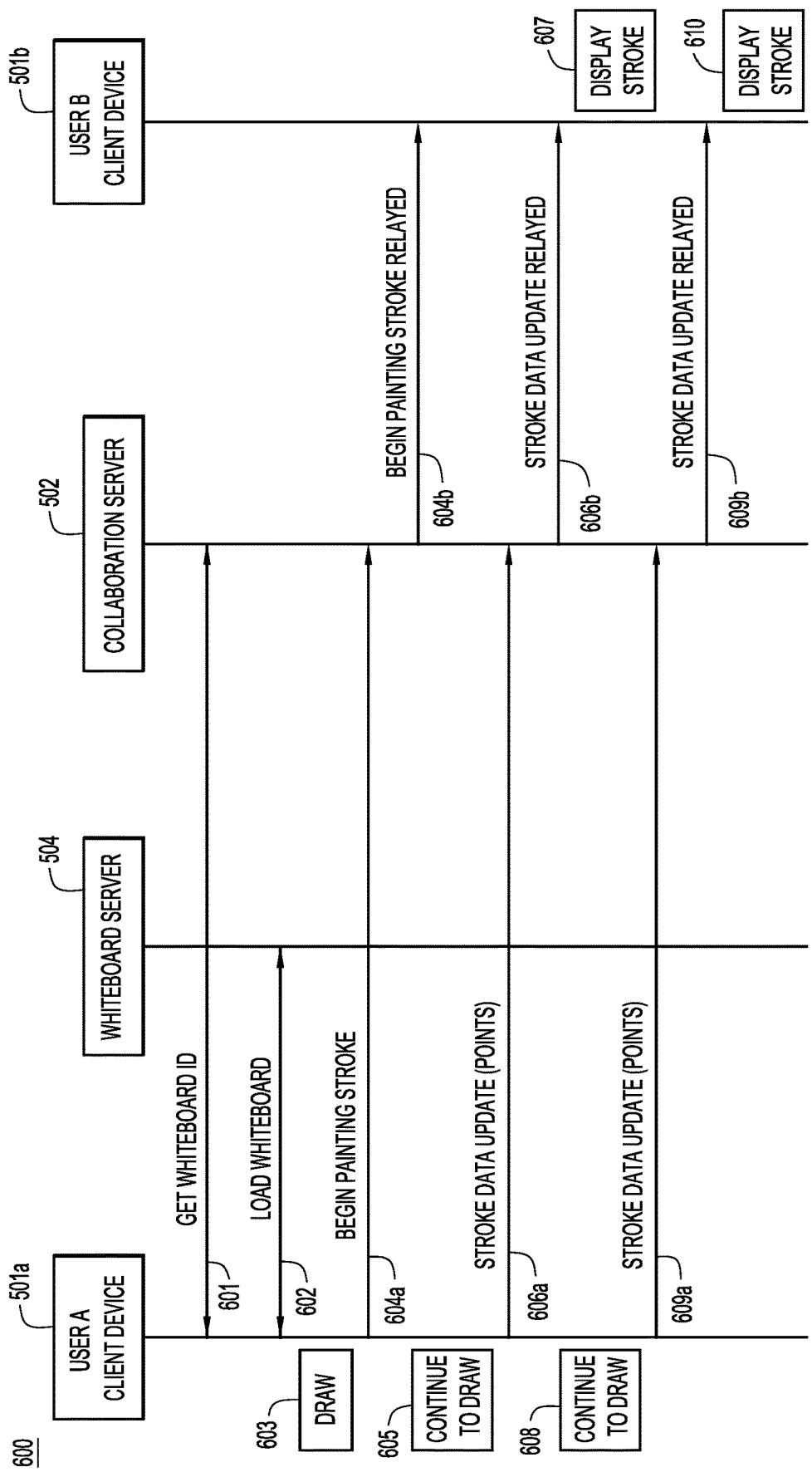
FIGS. 8A and 8B illustrate a sequence diagram of a process performed across each entity involved in a whiteboard session, according to an example embodiment.
Figure 8B:
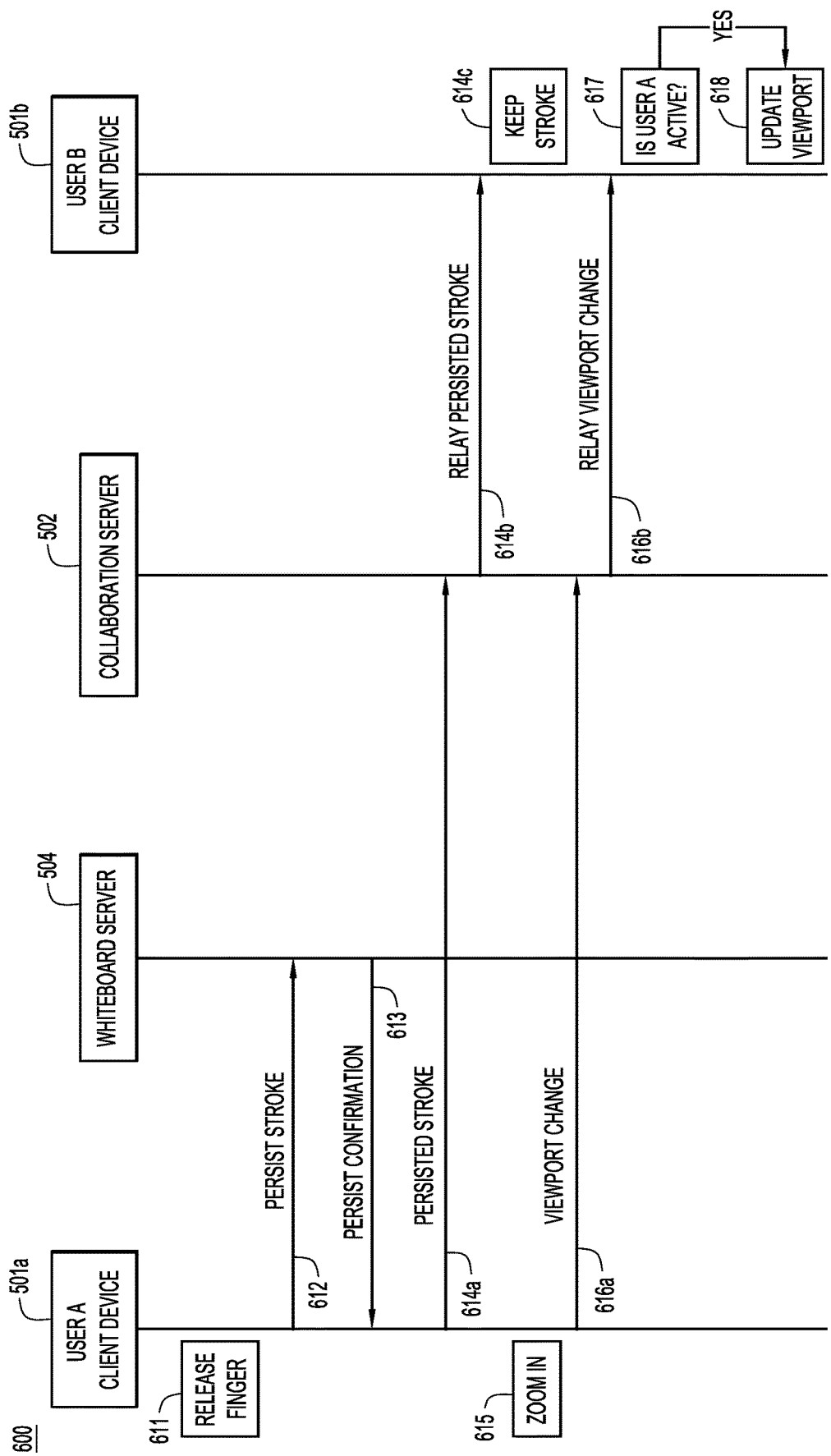

FIGS. 8A and 8B illustrate a sequence diagram for a process 600 involving operations performed by each entity involved in a whiteboard session, according to an example embodiment. The process 600 involves client devices 501*a* and 501*b*, associated with user A and user B, respectively; collaboration server 502 and whiteboard server 504.

As shown in FIG. 8A, users A and B participate in a whiteboard session using their respective client devices 501*a* and 501*b*. As shown at 601, the user A obtains a whiteboard identifier (ID) from a collaboration server 502 for a whiteboard session ("whiteboard") to which he/she is entitled/authorized to participate. In operation 602, based on the received identifier of the whiteboard, the user A obtains and loads the whiteboard content from the whiteboard server 504. Similarly, although not shown, the user B may obtain the whiteboard ID for a whiteboard session and may load the whiteboard from the whiteboard server 504. In an example embodiment, both users A and B initially share the same viewport.

At 603, the user A may begin drawing on the whiteboard (draw). For example, the user A executes initial painting stroke on the viewport displayed on client device 501*a*. The painting stroke is communicated to the collaboration server 502, in operation 604*a*. The collaboration server 502, however, does not process the painting strokes but forwards the detected activity to other participants of the whiteboard session. That is, begin painting stroke is relayed to other client devices participating in the whiteboard session, in operation 604*b*. That is, the collaboration server 502 broadcasts the detected activity to other users of the whiteboard session e.g., to the client device 501*b* of the user B. Since the painting stroke does not meet a predetermined threshold, the client device 501*b* of the user B takes no further action and his viewport remains unchanged. At some point, the painting stroke meets the predetermined threshold, and the user A of the client device 501*a* is set as the active user on the client device 501*b* of the user B.

When the user A continues the drawing stroke (continue to draw) in operation 605, the updated stroke data (activity of user A) is broadcasted to the other users in the whiteboard session (user B) via collaboration server 502. In other words, the client device 501*a* transmits stroke data update (points) to the collaboration server 502 in operation 606*a* and the collaboration server 502 relays the stroke data update in operation 606*b*. In an example embodiment data update includes, but is not restricted to, point coordinates for the points making up a stroke (a stroke being a list of points from the start to the end). According to a variation of an example embodiment and not by way of a limitation, timestamps and width of the stroke at each point, as well as color codes for each stroke, may be provided. The stroke is then displayed on the screen of the client device 501*b* of the user B, (display stroke) in operation 607. According to an example embodiment, the user B obtains the latest viewport of the user A, which may be communicated with the activity update in operations 606*a* and 606*b*, and displays the viewport of the user A. The process continues, via operations 608, 609*a*, 609*b* and 610 for further stroke data updates made by user A. That is, the active user A makes changes to the whiteboard via the client device 501*a* and these changes are reflected in real-time on the viewports of the passive users of the whiteboard session, such as the client device 501*b* of the user B. These changes are shared in real-time, on-the-fly, as they occur. For example, while the user is making a painting stroke or a drawing stroke, this stroke is reflected in real-time on the viewports of the passive users.

In FIG. 8B, in operation 611, the user A may stop drawing on the whiteboard via the client device 501*a* i.e., release a finger that was drawing. Since the activity has stopped, the user A may decide to now store the change that was made in the whiteboard service. According to another example embodiment, the whiteboard is automatically updated in the whiteboard server 504 based on an end of a particular activity e.g., after each stroke. That is, the canvas stored by the whiteboard server 504 is updated with the changes made by the user A (transmit persist stroke from the client device 501*a* to the whiteboard server 504) in operation 612. In operation 613, the client device 501*a* of the user A receives an acknowledgment that the modifications are stored in the whiteboard (persist confirmation). Further, viewports of other passive participants are updated with the persisted stroke (saved stroke). That is, in operation 614*a*, the persisted stroke is transmitted from the client device 501*a* to the collaboration server 502 and in operation 614*b*, the persisted stroke is relayed from the collaboration server 502 to the client device 501*b*, which keeps the stroke in operation 614*c*.

In operation 615, the user A, via the client device 501*a*, zooms in on a particular portion of the whiteboard. This change in the viewport of the client device 501*a* of the user A is broadcasted to all participants in the whiteboard session. Specifically, in operation 616*a*, the client device 501*a* transmits the viewport change to the collaboration server 502 and in operation 616*b*, the collaboration server 502 relays the viewport change to the participating client devices such as the client device 501*b*. The user B, who is a passive participant, via the client device 501*b*, then determines whether the user A is an active user, in operation 617. If the user A is determined to be an active user, in operation 617, the local viewport of the user B is updated to reflect the viewport change of the user A, in operation 618. If the user A is determined not to be an active user, the change is ignored.

Figure 9:
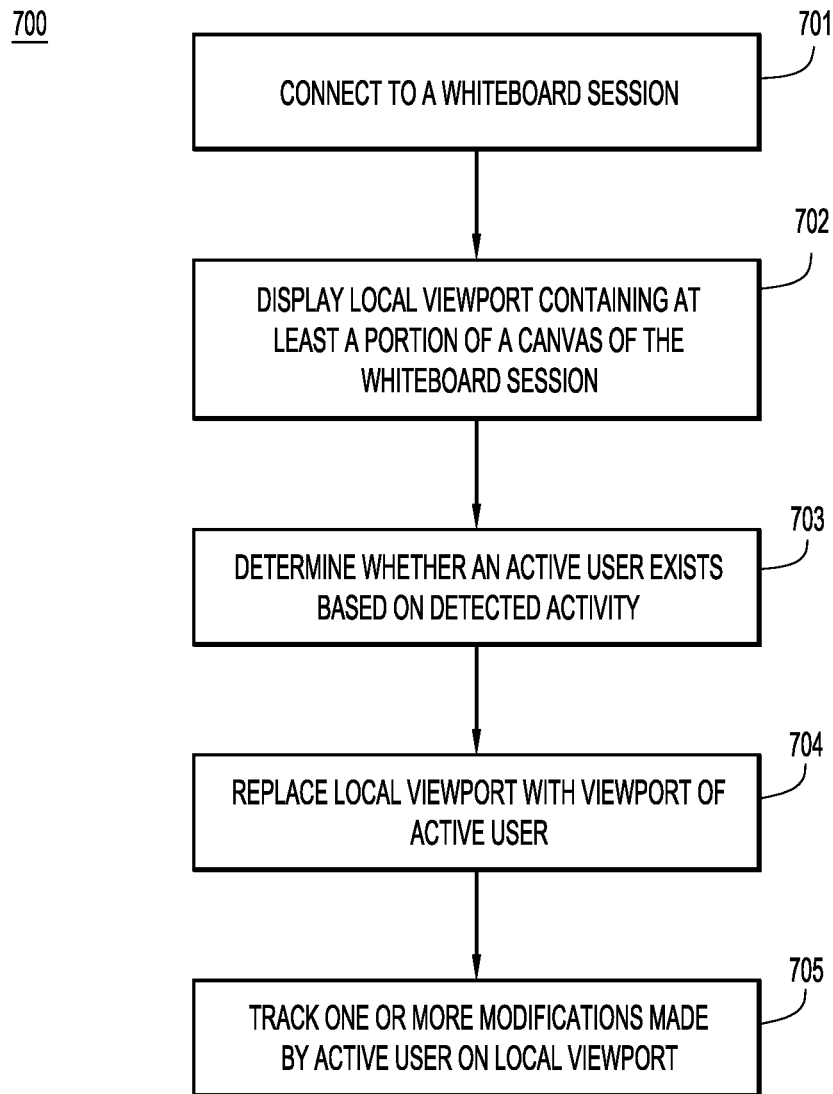
FIG. 9 is a flowchart illustrating a process performed by a client device to perform the viewport tracking operations presented herein, according to an example embodiment.

FIG. 9 is a flowchart illustrating a method 700 performed by a client device participating in a whiteboard session for determining whether to follow another participant in the whiteboard session, according to an example embodiment. A client device connects to a whiteboard session, in operation 701. Once connected, the device will display a local viewport containing at least a portion of a canvas associated with the whiteboard session to which it is connected, in operation 702. Based on detecting activity from one or more other devices participating in the whiteboard session, the device determines whether to set one of the other device as a device of an active user in the collaborative whiteboard session, in operation 703. If the detected activity does not amount to a level of an active user, no further action is taken by the device of the first participant. On the other hand, if the amount of activity is sufficient to indicate a presence of an active user, the local viewport is replaced with a viewport of the active user, in operation 704. In other words, the local viewport of the first participant is mapped to match the viewport of an active user. Then, modifications made by the active user to the content of the collaborative whiteboard session are tracked on the local viewport, in operation 705. That is, the first participant via the first device follows, in real-time, changes made to the canvas by the active user.

In other words, the method depicted in FIG. 9 involves connecting, by a first device, to a collaborative whiteboard session to which at least a second device is connected and displaying, on the first device, a local viewport containing at least a portion of content of the collaborative whiteboard session. In this method, based on detecting an activity from the second device with respect to the content of the collaborative whiteboard session, the first device determines whether to set the second device as active in the collaborative whiteboard session. Based on the second device being set as active, the local viewport is replaced on the first device with a second viewport of the second device and one or more modifications made by the second device to the content of the collaborative whiteboard session are tracked on the second viewport, displayed on the first device.

According to one or more example embodiments, the activity from the second device may include at least one of (a) manipulating the second viewport to display a different portion of the content of the collaborative whiteboard session, and (b) modifying the contents of the collaborative whiteboard session displayed on the second viewport. The one or more modifications may include at least one of (a) manipulating the second viewport to display the different portion of the content of the collaborative whiteboard session, and (b) modifying the contents of the collaborative whiteboard session displayed on the second viewport.

Further, according to yet one or more example embodiments, the activity from the second device includes a continuous drawing or a painting stroke, by the second device, with respect to the content of the collaborative whiteboard session.

According to one or more example embodiments, the method 700 may further include detecting, by the first device, another activity from a third device that is connected to the collaborative whiteboard session, and determining, by the first device, whether the another activity satisfies a predetermined threshold. Based on the determining that another activity satisfies the predetermined threshold, determining, by the first device, a presence of an active device, other than the third device, in the collaborative whiteboard session. Based on the determining the presence of the active device, ignoring, by the first device, another activity of the third device. Based on the determining an absence of the active device, setting, by the first device, the third device as active and mapping the local viewport of the first device to a third viewport of the third device to track the activity of the third device.

According to one or more example embodiments, the method 700 may further include, based on the determining the presence of the active device, determining, by the first device, whether the active device has been inactive for a predetermined period of time. Based on the determining that the second device has been inactive for the predetermined period of time, setting, by the first device, the third device as active and mapping the local viewport of the first device to the third viewport of the third device to track the another activity of the third device.

According to one or more example embodiments, the predetermined threshold may include an activity threshold and a time threshold.

According to one or more example embodiments, the method 700 may further include, based on the first device connecting to the collaborative whiteboard session, receiving, by the first device from a whiteboard session server, encrypted data comprising the content of the collaborative whiteboard session. Also, the detecting the activity from the second device may include receiving, by the first device from the second device, status data that includes status of the second device, coordinates of the second viewport with respect to the content of the collaborative whiteboard session, and activity data.

According to one or more example embodiments, the method 700 may further include detecting, by the first device, a local activity with respect to the second viewport displayed by the first device. Based on detecting the local activity, replacing, by the first user device, the second viewport with the local viewport and tracking the local activity of the first device on the local viewport.

Figure 10:
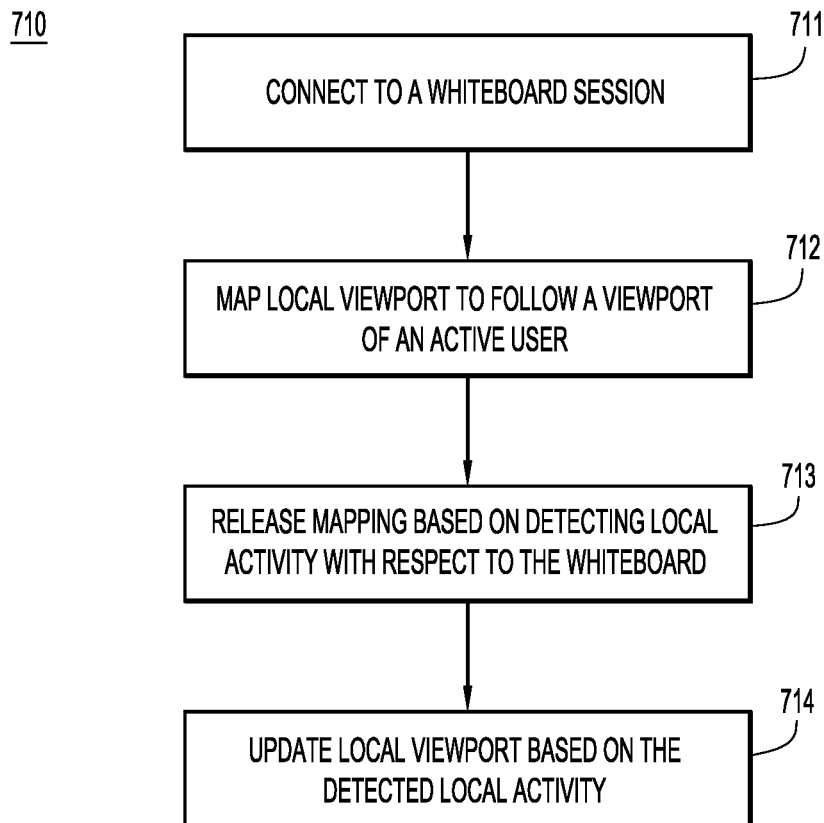
FIG. 10 is a flowchart illustrating a process performed by a client device to perform local modification operations presented herein, according to an example embodiment.

Reference is now made to FIG. 10. FIG. 10 is a flowchart illustrating a method 710 performed by a user/client device for switching from following a participant to becoming an active user, according to an example embodiment.

In operation 711, a first client device connects to participate in a whiteboard session with one or more remote client devices. As the first client device connects to the whiteboard session, the first client device obtains the same slice of the canvas, same viewport, as a viewport of an active user. That is, a local viewport of the first client device is mapped to follow a viewport of an active user, in operation 712. Next, in operation 713, based on detecting local activity (at the first device) updating of the whiteboard content, the mapping of the local viewport at the first client to the viewport of the active user is automatically released. In operation 714, the local viewport of the first client is updated based on the detected local activity.

In other words, the method depicted in FIG. 10 involves connecting, by a first device, to a collaborative whiteboard session to which at least a second device is connected and mapping a local viewport of the first device to follow a second viewport of the second device based on the second device being set as active in the collaborative whiteboard session. The method further involves releasing a mapping of the local viewport to the second viewport based on detecting an activity of the first device with respect to content of the whiteboard session and updating the local viewport based on the activity detected from the first device.

According to one or more example embodiments, the method 710 may further include, based on detecting inactivity of the first device, for a predetermined period of time, re-mapping the local viewport to the second viewport of the second device.

According to one or more example embodiments, the method 710 may further include broadcasting, by the first device to other devices connected to the collaborative whiteboard session including the second device, data related to the activity of the first device and the local viewport.

According to one or more example embodiment, the activity may further include initiating a stroke on the local viewport.

According to one or more example embodiment, the method 710 may further include detecting, by the first device, a release of the stroke on the local viewport and based on the detecting the release of the stroke, transmitting, by the first device to a collaborative whiteboard session server, persist data including a whiteboard session identifier and the local viewport modified by the stroke.

In still another embodiment, an apparatus is provided, which includes a communication interface configured to enable network communications, a display, a memory configured to store executable instructions, and a processor coupled to the communication interface and the memory. The processor is configured to connect the apparatus to a collaborative whiteboard session to which at least a second device is connected. The processor is further configured to control the display to display a local viewport containing at least a portion of content of the collaborative whiteboard session and based on an activity detected by the processor from the second device with respect to the content of the collaborative whiteboard session, determine whether to set the second device as active. Based on the second device being set as active, the processor is configured to control the display to replace the local viewport on the display with a second viewport of the second device and to track on the second viewport, displayed on the display, one or more modifications made by the second device to the content of the collaborative whiteboard session.

According to one or more example embodiments, the activity from the second device may include at least one of (a) manipulating the second viewport to display a different portion of the content of the collaborative whiteboard session, and (b) modifying the contents of the collaborative whiteboard session displayed on the second viewport. The one or more modifications made by the second device may include at least one of (a) manipulating the second viewport to display the different portion of the content of the collaborative whiteboard session, and (b) modifying the contents of the collaborative whiteboard session displayed on the second viewport.

According to one or more example embodiments, the activity from the second device may include a continuous drawing or a painting stroke, by the second device, with respect to the content of the collaborative whiteboard session.

According to one or more example embodiments, the processor may further be configured to detect another activity from a third device that is connected to the collaborative whiteboard session and determine whether another activity satisfies a predetermined threshold. Based on determining that another activity satisfies the predetermined threshold, the processor may further be configured to determine a presence of an active device, other than the third device, in the collaborative whiteboard session. Based on determining the presence of the active device, the processor may be configured to ignore the another activity of the third device and based on determining an absence of the active device, the processor may be configured to set the third device as active and map the local viewport displayed on the display to a third viewport of the third device to track the activity of the third device.

According to one or more example embodiment, the processor may further be configured to, based on determining the presence of the active device, determine whether the active device has been inactive for a predetermined period of time. Based on the determining that the second device has been inactive for the predetermined period of time, the processor may further be configured to set the third device as active and map the local viewport, displayed on the display, to the third viewport of the third device to track the another activity of the third device.

According to one or more example embodiments, the predetermined threshold may include an activity threshold and the time threshold.

According to one or more example embodiments, based on the first device connecting to the collaborative whiteboard session, the processor may further be configured to receive, from a whiteboard session server, encrypted data including the content of the collaborative whiteboard session. The processor detects the activity from the second device by receiving, from the second device, status data that includes status of the second device, coordinates of the second viewport with respect to the content of the collaborative whiteboard session, and activity data.

Various example embodiments have been describes with respect to a whiteboard session but these example embodiments are applicable to any applications which require a collaborative session and/or any applications may require a sharing of a document.

Various example embodiments have been described with respect to a P2P network and autonomous user devices. Each user device independently decides on an active user and in real-time and on-the-fly tracks user activity in a whiteboard session e.g., as a drawing stroke is occurring. One of ordinary skill in the art, however, would readily appreciate that in another example embodiment, an arbitration entity maybe provided that would arbitrate or make decisions for setting an active user in the whiteboard session and communicating this decision to various endpoints, which would send dynamically track the activity of the active user as it is occurring.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   connecting, by a first device, to a collaborative whiteboard to which at least a second device is connected;
   providing, in a local viewport of the collaborative whiteboard on the first device and in response to a first input by a first user associated with the first device, a first portion of collaborative whiteboard content;
   providing, in the local viewport of the collaborative whiteboard on the first device after providing the first portion and in response to a second input by the first user to follow a viewport of the collaborative whiteboard local to the second device, a second portion of the collaborative whiteboard content, wherein:
   the second portion of the collaborative whiteboard content comprises at least a portion of content displayed in the viewport of the collaborative whiteboard local to the second device, and
   the second portion of the collaborative whiteboard content is based at least in part on tracking activity of a second user, associated with the second device, with respect to the viewport of the collaborative whiteboard local to the second device;
   modifying the collaborative whiteboard content in the second portion based on a third input from the first user, wherein the third input is received on the first device after providing the second portion of the collaborative whiteboard content in the local viewport of the collaborative whiteboard on the first device;
   providing, in the local viewport of the collaborative whiteboard on the first device after modifying the collaborative whiteboard content in the second portion, a third portion of the collaborative whiteboard content, wherein the third portion of the collaborative whiteboard content comprises at least a different portion of content displayed in the viewport of the collaborative whiteboard local to the second device; and
   providing, in the local viewport of the collaborative whiteboard on the first device after providing the third portion of the collaborative whiteboard content and in response to a fourth input by the first user to stop following the viewport of the collaborative whiteboard local to the second device, a fourth portion of the collaborative whiteboard content.

2. The method of claim 1, wherein the fourth portion of the collaborative whiteboard content is based at least in part upon the first user manipulating the local viewport of the collaborative whiteboard on the first device to display another portion of the collaborative whiteboard content different from the third portion.

3. The method of claim 1, wherein the activity of the second user relates to modifying the content of the collaborative whiteboard.

4. The method of claim 3, wherein the activity of the second user relates to the second user painting a stroke on the collaborative whiteboard content.

5. The method of claim 1, wherein the activity of the second user relates to manipulating the viewport of the collaborative whiteboard local to the second device to display another portion of the collaborative whiteboard content.

6. The method of claim 5, wherein the other portion of the collaborative whiteboard content corresponds to an area of interest to the second user.

7. The method of claim 1, further comprising:
   providing, on the first device and prior to receiving the second input, a prompt to follow the viewport of the collaborative whiteboard local to the second device, wherein the second input comprises a response to the prompt.

8. The method of claim 1, further comprising:
providing, on the first device and prior to receiving the fourth input, a prompt to stop following the viewport of the collaborative whiteboard local to the second device, wherein the fourth input comprises a response to the prompt.

9. The method of claim 1, wherein the fourth portion of the collaborative whiteboard content is provided based on an editing action, performed by the first user, with respect to the collaborative whiteboard content on the local viewport of the collaborative whiteboard on the first device.

10. A system comprising:
one or more processors;
one or more network interfaces operably coupled to at least one of the one or more processors; and
one or more memories operably coupled to at least one of the one or more processors storing instructions that, when executed by at least one of the one or more processors, cause the system to:
provide, to a first device and in response to a first input by a first user associated with the first device, first information relating to a collaborative whiteboard to which at least a second device is connected, wherein the first information relates to a first portion of collaborative whiteboard content to be displayed in a local viewport of the collaborative whiteboard on the first device;
receive, from the second device, second information relating to content displayed in a viewport of the collaborative whiteboard local to the second device, wherein the second information is based at least in part upon tracking activity of a second user, associated with the second device, with respect to the viewport of the collaborative whiteboard local to the second device;
provide, to the first device after receiving the second information and in response to a second input by the first user to follow the viewport of the collaborative whiteboard local to the second device, third information based at least in part upon the second information, wherein:
the third information relates to at least a portion of the content displayed in the viewport of the collaborative whiteboard local to the second device, and
the third information relates to a second portion of the collaborative whiteboard content displayed in the local viewport of the collaborative whiteboard on the first device;
modify the collaborative whiteboard content in the second portion based on fourth information received from the first device, wherein the fourth information is based in part upon a third input from the first user, and the third input is received on the first device after providing the third information;
provide, to the first device after modifying the collaborative whiteboard content in the second portion, fifth information, wherein:
the fifth information relates to at least a different portion of the content displayed in the viewport of the collaborative whiteboard local to the second device, and the fifth information relates to a third portion of the collaborative whiteboard content displayed in the local viewport of the collaborative whiteboard on the first device; and
provide, to the first device after providing the fifth information and in response to a fourth input by the first user to stop following the viewport of the collaborative whiteboard local to the second device, sixth information, wherein the sixth information relates to a fourth portion of the collaborative whiteboard content displayed in the local viewport of the collaborative whiteboard on the first device.

11. The system of claim 10, wherein the fourth portion of the collaborative whiteboard content is responsive to the first user manipulating the local viewport of the collaborative whiteboard on the first device to display another portion of the collaborative whiteboard content different from the third portion.

12. The system of claim 10, wherein the activity of the second user relates to modifying the content of the collaborative whiteboard.

13. The system of claim 10, wherein the activity of the second user relates to manipulating the viewport of the collaborative whiteboard local to the second device to display another portion of the collaborative whiteboard content.

14. The system of claim 13, wherein the other portion of the collaborative whiteboard content corresponds to an area of interest to the second user.

15. The system of claim 10, wherein the second input comprises a response to a prompt for the first user of the first device to follow the viewport of the collaborative whiteboard local to the second device.

16. One or more non-transitory computer readable media storing executable instructions that, when executed by a processing device, cause the processing device to:
connect to a collaborative whiteboard to which at least a second device is connected;
provide, in a local viewport of the collaborative whiteboard on the processing device and in response to a first input by a first user associated with the processing device, a first portion of collaborative whiteboard content;
provide, in the local viewport of the collaborative whiteboard on the processing device after providing the first portion and in response to a second input by the first user to follow a viewport of the collaborative whiteboard local to the second device, a second portion of the collaborative whiteboard content, wherein:
the second portion of the collaborative whiteboard content comprises at least a portion of content displayed in the viewport of the collaborative whiteboard local to the second device, and
the second portion of the collaborative whiteboard content is based at least in part on tracking activity of a second user, associated with the second device, with respect to the viewport of the collaborative whiteboard local to the second device;
modify the collaborative whiteboard content in the second portion based on a third input from the first user, wherein the third input is received on the processing device after providing the second portion of the collaborative whiteboard content in the local viewport of the collaborative whiteboard on the processing device;
provide, in the local viewport of the collaborative whiteboard on the processing device after modifying the collaborative whiteboard content in the second portion, a third portion of the collaborative whiteboard content, wherein the third portion of the collaborative whiteboard content comprises at least a different portion of content displayed in the viewport of the collaborative whiteboard local to the second device; and provide, in the local viewport of the collaborative whiteboard on the processing device after providing the third portion of the collaborative whiteboard content and in response to a fourth input by the first user to stop following the viewport of the collaborative whiteboard local to the second device, a fourth portion of the collaborative whiteboard content.

17. The one or more non-transitory computer readable media of claim 16, wherein the fourth portion of the collaborative whiteboard content is based at least in part upon the first user manipulating the local viewport of the collaborative whiteboard on the processing device to display a portion of the collaborative whiteboard content different from the third portion.

18. The one or more non-transitory computer readable media of claim 16, wherein the activity of the second user relates to modifying the content of the collaborative whiteboard.

19. The one or more non-transitory computer readable media of claim 16, wherein the activity of the second user relates to manipulating the viewport of the collaborative whiteboard local to the second device to display another portion of the collaborative whiteboard content.

20. The one or more non-transitory computer readable media of claim 16, wherein the executable instructions, when executed by the processing device, cause the processing device to:

provide, on the processing device and prior to receiving the second input, a prompt to follow the viewport of the collaborative whiteboard local to the second device, wherein the second input comprises a response to the prompt.

* * * * *